United States Patent Office 2,879,963
Patented Mar. 31, 1959

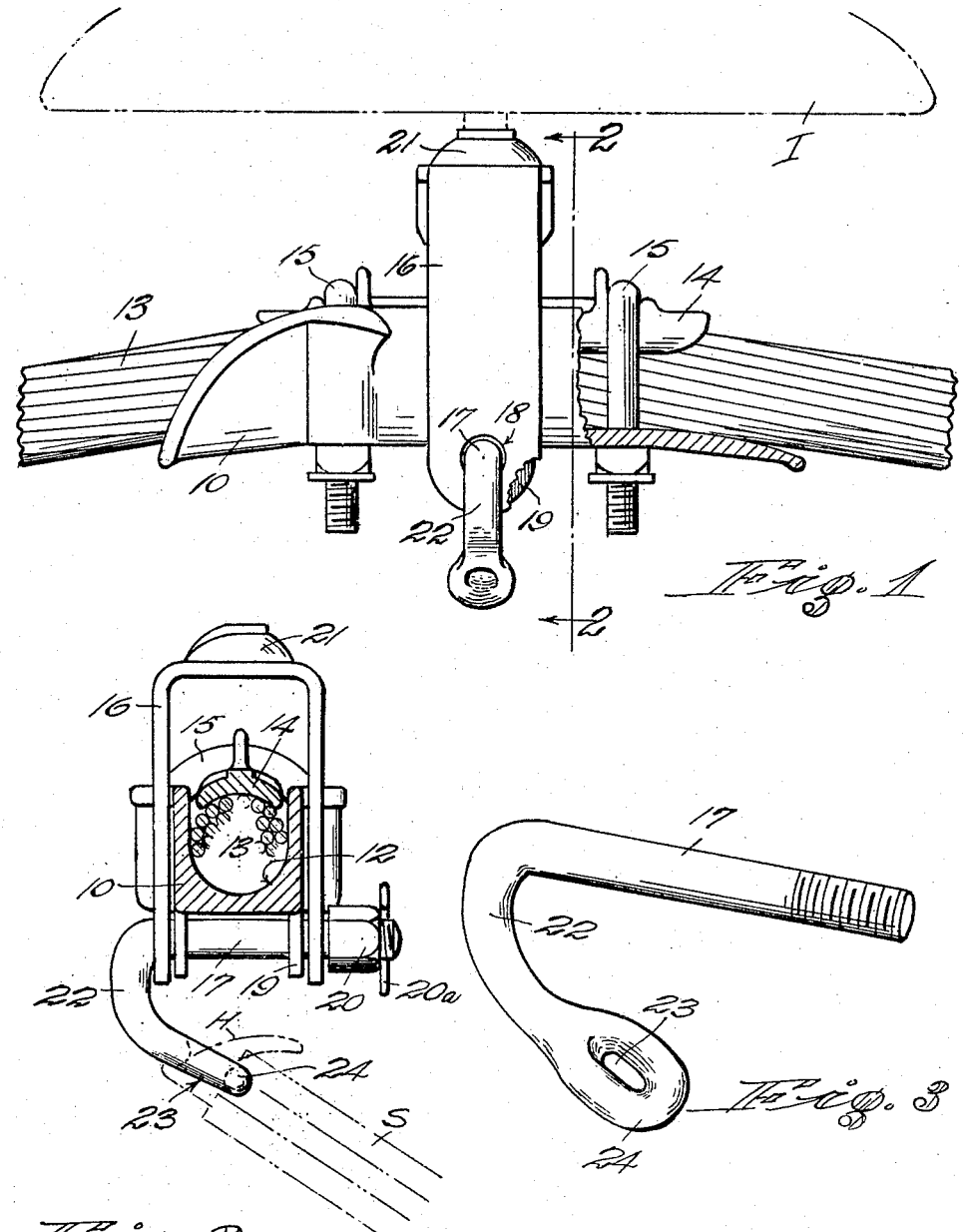

2,879,963
HANGERS FOR TRANSMISSION CABLES

Thomas J. Burgess, Toronto, Ontario, and Frederick G. Ridgers, Hamilton, Ontario, Canada, assignors to N. Slater Company Limited, Hamilton, Ontario, Canada Application July 29, 1955, Serial No. 525,178

1 Claim. (Cl. 248—63)

This invention relates to improvements in hangers for high-voltage power transmission cables or conductors, more particularly the separable coupling which unites the cable suspension cradle to the lowermost of the conventional articulated string of insulators suspended from an arm or other structure of a transmission line tower.

When insulator failures develop the cable must be disconnected from the string in order that one or more insulators of the string may be replaced. Since the cradle is securely clamped to the cable it is expedient that it remain in its fixed position thereon, and it is therefore customary to disconnect the cradle from the string by removing the coupling pin or bolt from a clevis or the like which conventionally couples the cradle to the lowermost insulator.

In making such repairs or replacements the transmission cable must not be de-energized, and it is customary to disconnect the parts by means of tools, such as socket wrenches, attached to the end of a highly insulated pole. Such servicing is termed "hot stick operation."

Prior to freeing the cable an insulated temporary rigging is slung from the tower and the cable is held against sag by this rigging during the period of servicing. The rigging spots the cable out of the zone of operation, and the string of insulators may then be safely detached from the supporting arm or cantilever and lowered to the ground.

Heretofore an ordinary headed coupling pin having a plain shank and threaded on its end portion for a nut has been used to unite the cradle to the coupling, usually in the form of a clevis, depending from the lowermost insulator.

While it is a relatively simple operation to remove the cotter from the end of the pin and then the nut, and to replace them, by the use of a hot line stick, trouble has always been experienced in extracting the pin itself. No hot line stick tool for properly removing a conventional pin is known, and conversely no special pin is known which lends itself for manipulation in and out of its effective position by any known hot line stick instrument.

The principal object of the present invention is to provide a coupling pin for cradle and clevis couplings which may be conveniently removed from its effective position and thereto returned by means of a known hot stick implement.

Another important object is to provide a pin of the kind specified which may be so removed and returned by an operator without his taking a different position than the one wherefrom he detaches and replaces the nut and cotter associated with the pin.

Still another important object is to provide a pin of the class described which will be simple, effective, and inexpensive to produce.

These together with other objects which may later become apparent may be attained by the combination of parts and structure which will be hereinafter fully described, illustrated in the accompanying drawings and specifically claimed.

Referring now to the drawing, in which similar reference characters refer to corresponding parts throughout all the views:

Figure 1 is a side elevation, partially in section, of a well known type of cable suspension cradle and clevis, showing therewith a coupling pin as constructed in accordance with the present invention;

Figure 2 is a cross-section taken on the line 2—2 of Figure 1; and

Figure 3 is a perspective view of the new pin.

The conventional cradle or saddle 10 consists of an elongate arcuate device having a U-shaped cable bed 12 throughout its length. Usually the bed conforms in cross-section to the diameter or gauge of the cable 13 which the cradle is designed to carry. The cradle is arcuate in order to substantially conform to the normaly slow curvature of the cable at the point of suspension between catenary spans. The shoe 14 and U-bolts 15 clamp the cradle to the cable.

Such cradles are shackled or coupled to the lowermost of a string of insulators by means of a clevis or other common coupling device 16 which is connected to the cradle by a coupling pin 17. The pin is loosely applied and is therefore easily withdrawn when the load of the cable is removed by its preliminary transfer to the temporary rigging or sling (not shown) previously mentioned. The cradle is free to rock or teter on the axis of the pin 17 in response to the whip and sway of the cable and pendulous motion of the insulator string as induced by the elements.

In one common type of cradle the coupling pin is arranged above the cradle while in another it is located beneath. Since the latter overslung type is the preferred form, that structure is here shown as illustrative of a typical arrangement. It is to be understood, however, that the specific location of the pin in relation to the cradle is immaterial to the invention.

The legs of the coupling 16, here shown in the form of a clevis, embrace the cradle and have pin openings 18 which coincide with like pin openings in lugs or ears 19 on the bottom of the cradle. The pin 17 extends through these openings. The conventional pin has a head for preventing displacement, and a nut 20 for the same purpose. The coupling is connected to the lowermost insulator I, here shown in outline in chain lines, usually by a ball and socket joint, the socket portion 21 of which is formed in the web of the clevis.

In its present embodiment the invention consists of a coupling pin 17 having, instead of the usual head, a head 22 formed by a continuation of the effective pivotal portion of the shank bent at an angle to the main axis. This bent portion or head is effective, in the same functional manner as a conventional head, in preventing displacement of the pin in the direction opposite to that in which the pin is withdrawn from its effective position.

In the free end portion of the head is an eye 23. Preferably the eye is formed by an end loop 24 on the head, and preferably also the margin of the eye is fully rounded.

The eye 23 is for the purpose of receiving a hook H associated with an implement on the end of a hot line stick S, here shown in outline by chain lines. The hook is preferably of the type known as a spring loaded hook, which hooks through the eye and on release of a spring retracts and pulls the stick toward the head 22 so that the loop 24 is temporarily partially swallowed by the implement and held rigidly in a throat-like groove therein.

The pin may now be extracted from its effective position, then later restored, by manipulating it with the stick, the nut 20 and its associated cotter 20a first having been removed.

In practice it is obviously important that the operator or lineman disconnect the nut 20, then the pin, or perform the steps of the reverse operation, without altering his position. Since he roughly faces the tail of the pin when he removes the nut and cotter, he should extract the pin whilst facing the same way. In order thus to facilitate the mating of the hook H with the eye 23, and further to remove the pin and to replace it by a substantially direct thrust and pull, respectively, on the stick, the head or portion 22 of the pin is preferably formed in recurvation, which disposes the axis of the eye closer to vertical than horizontal.

The hook equipped stick is common in the line hardware trade, one such being well known as the Slater Spring Hook Hot Stick End, Catalogue No. 60051.

We claim:

In a cable suspension cradle, a coupling member, a substantially horizontaly disposed coupling pin having head, tail, and pivotal bearing shank portions pivotally connecting said cradle with said member, the head and tail portions extending outwardly from said cradle and coupling members, retention means on the tail of said pin capable of being removed and replaced by a hot line stick tool, the head portion of said pin bent back towards its tail so as to form an angle of 90° or less to said shank and tail portions, the bent portion of the pin bearing against the coupling member and acting as a stop when the device is assembled, and means on said head whereby temporary union with a hot stick line tool may be effected.

References Cited in the file of this patent

UNITED STATES PATENTS

| | | |
|---|---|---|
| 1,815,821 | Baker | July 21, 1931 |
| 1,871,350 | Wahlberg | Aug. 9, 1932 |
| 2,303,108 | Blackburn | Nov. 24, 1942 |
| 2,687,899 | Bendtsen | Aug. 31, 1954 |

FOREIGN PATENTS

| | | |
|---|---|---|
| 361,372 | Great Britain | Nov. 12, 1931 |